United States Patent
Leonov et al.

(10) Patent No.: US 9,107,142 B2
(45) Date of Patent: Aug. 11, 2015

(54) NETWORK SELECTION METHODS AND APPARATUS WITH USE OF A MASTER SERVICE MANAGEMENT MODULE AND A PRIORITIZED LIST OF MULTIPLE AGGREGATOR SERVICE PROFILES

(75) Inventors: Andrey Leonov, Waterloo (CA); Jing Chuan Zhao, Toronto (CA); Kevin Oerton, Waterloo (CA); Denis Fedotenko, Waterloo (CA); Christopher Maybee Ryerson, Ottawa (CA); Jayesh Beldar, Mississauga (CA)

(73) Assignee: BlackBerry Limited, Waterloo (CA)

( * ) Notice: Subject to any disclaimer, the term of this patent is extended or adjusted under 35 U.S.C. 154(b) by 254 days.

(21) Appl. No.: 12/858,584

(22) Filed: Aug. 18, 2010

(65) Prior Publication Data

US 2012/0047269 A1 Feb. 23, 2012

(51) Int. Cl.
*G06F 15/16* (2006.01)
*H04W 48/16* (2009.01)
(Continued)

(52) U.S. Cl.
CPC .............. *H04W 48/16* (2013.01); *H04L 67/306* (2013.01); *H04W 4/021* (2013.01); *H04W 48/18* (2013.01); *H04W 76/02* (2013.01); *H04W 84/12* (2013.01)

(58) Field of Classification Search
USPC ......... 709/203, 204, 217, 218, 219, 220, 223, 709/224, 225, 226, 227, 228, 229, 232, 235, 709/238; 370/252, 229, 242, 245, 310, 328, 370/340, 335, 342, 344, 347, 336, 337, 338, 370/441, 479, 901, 902, 912, 913, 915; 455/403, 406, 410, 411, 432.1, 434, 455/435.1, 435.2, 435.3, 445, 450, 551, 455/552, 552.1, 553.1, 426.2, 456.1, 456.2, 455/456.3, 456.4, 456.5, 456.6
See application file for complete search history.

(56) References Cited

U.S. PATENT DOCUMENTS 5,987,011 A 11/1999 Toh
6,529,491 B1 * 3/2003 Chang et al. .................. 370/335

(Continued)

FOREIGN PATENT DOCUMENTS

EP 0781064 A2 6/1997
WO 9810617 A1 3/1998
(Continued)

OTHER PUBLICATIONS

European Search Report & Written Opinion for EP Application #10173329.3, Dec. 13, 2010.
(Continued)

*Primary Examiner* — Saket K Daftuar
(74) *Attorney, Agent, or Firm* — Ridout & Maybee LLP (57) ABSTRACT

A communication device is configured to store one or more aggregator service application modules for use in accessing one or more different aggregator services. Each aggregator service offers access through a plurality of offered wireless networks identified by a plurality of offered wireless network identifiers. The communication device maintains a prioritized list of profiles which include one or more aggregator service profiles associated with the one or more aggregator services. A scanning operation is performed for identifying one or more available wireless networks in a geographic area of the device, for producing a scan list of one or more available wireless network identifiers corresponding to the one or more available wireless networks. One of the aggregator service profiles is selected from the prioritized list, causing one of the aggregator service application modules corresponding to the selected profile to be invoked. The invoked module causes one of the available wireless network identifiers from the scan list that matches one of the offered wireless network identifiers to be selected, if such matching identifier exists. A connection is established with one of the available wireless networks corresponding to the selected available wireless network identifier, for accessing a selected aggregator service corresponding to the selected aggregator service profile.

20 Claims, 6 Drawing Sheets

(51) Int. Cl.
*H04W 4/02* (2009.01)
*H04L 29/08* (2006.01)
*H04W 48/18* (2009.01)
*H04W 76/02* (2009.01)
*H04W 84/12* (2009.01)

(56) References Cited

U.S. PATENT DOCUMENTS

| | | | |
|---|---|---|---|
| 7,221,904 B1 | 5/2007 | Gavrilovich | |
| 7,483,984 B1* | 1/2009 | Jonker et al. | 709/226 |
| 7,496,360 B2* | 2/2009 | Sindhwani et al. | 455/422.1 |
| 7,693,516 B2* | 4/2010 | Hundal et al. | 455/435.1 |
| 8,055,256 B2 | 11/2011 | Rudowicz et al. | |
| 8,090,395 B2* | 1/2012 | Ngai et al. | 455/513 |
| 8,411,604 B2* | 4/2013 | Reif | 370/310 |
| 2003/0096611 A1* | 5/2003 | Cooper | 455/434 |
| 2003/0148786 A1* | 8/2003 | Cooper et al. | 455/552 |
| 2004/0068653 A1 | 4/2004 | Fascenda | |
| 2004/0192328 A1* | 9/2004 | Giacalone et al. | 455/455 |
| 2005/0163319 A1 | 7/2005 | Hancock et al. | |
| 2005/0195778 A1 | 9/2005 | Bergs et al. | |
| 2006/0209773 A1* | 9/2006 | Hundal et al. | 370/338 |
| 2007/0091861 A1* | 4/2007 | Gupta et al. | 370/338 |
| 2007/0191005 A1* | 8/2007 | Cooper et al. | 455/434 |
| 2008/0031211 A1* | 2/2008 | Kalavade et al. | 370/338 |
| 2008/0069065 A1* | 3/2008 | Wu et al. | 370/340 |
| 2009/0068970 A1* | 3/2009 | Ahmed et al. | 455/161.1 |
| 2010/0015978 A1* | 1/2010 | Yoon et al. | 455/435.3 |
| 2010/0195608 A1* | 8/2010 | Ishizu et al. | 370/329 |
| 2011/0075598 A1* | 3/2011 | Jalfon et al. | 370/311 |

FOREIGN PATENT DOCUMENTS

| | | |
|---|---|---|
| WO | 0049505 A1 | 8/2000 |
| WO | 0163843 A1 | 8/2001 |
| WO | 2007068992 A1 | 6/2007 |

OTHER PUBLICATIONS

Devicescape, "Universal Wi-Fi With Devicescape Easy WiFi", Application note, Date: Nov. 2009, pp. 1-8, Devicescape, San Bruno, CA. USA.

Devicescape, "Devicescape Easy WiFi", Product Overview, Date: Mar. 2010, pp. 1-18, vol. 4.0, Devicescape, San Bruno, CA. USA.

IPass, "IPass Connect 3.50 for Windows Mobile 6.0" User Guide, Date: May 2008, pp. 1-11, vol. 1.5, IPass.

IPass, "IPass Connect Mobility Manager User's Guide (Version 3.62 for Windows)", Date: Sep. 2008, pp. 1-29, vol. 1.1, IPass.

James McIllece, "Deploying Wireless Provisioning Services (WPS) Technology", Date: Mar. 2005, pp. 1-137.

* cited by examiner

NETWORK SELECTION METHODS AND APPARATUS WITH USE OF A MASTER SERVICE MANAGEMENT MODULE AND A PRIORITIZED LIST OF MULTIPLE AGGREGATOR SERVICE PROFILES

BACKGROUND

1. Field of the Technology

The present disclosure relates generally to techniques for use in providing access to aggregator services for a mobile communication device via a wireless network, such as via a wireless local area network (WLAN) hotspot or similar environment.

2. Description of the Related Art

A mobile communication device may obtain communication services in wireless communication networks, such as wireless local area networks (WLANs) which are based on IEEE 802.11-based communication standards. Throughout operation, the mobile device may exit and enter many different WLANs. To assist in selecting from these networks, the mobile device may utilize a prioritized list of network identifications.

The mobile device may encounter a WLAN which may be a "hotspot" which provides a captive portal. Here, a user login or other user response will be required prior to the mobile device obtaining any useful services via the WLAN hotspot. With laptop computers, users often intend to use and "surf" the Internet, interacting with the keyboard of the laptop computer to invoke a Web browser application when desired. When the Web browser application is opened, the request is detected which causes a request for a server site to be sent in order to receive data of a desired website. However, the request is typically redirected by a WLANs hotspot for user login, after which the mobile device will obtain service, assuming the authentication is positive. For mobile devices which are intended primarily for voice telephony (e.g. cell phones), electronic mail (e-mail) communications, and/or other "push-type" data communications, login is also required.

The popularity of Internet access through WLANs hotspots has led to the emergence of a new kind of entity: a hotspot aggregator. A hotspot aggregator provides wireless Internet access to its customers by renting a WLAN connection to the Internet (i.e. the "WLAN hotspot") from a plurality of hotspot owners (e.g. at coffee shops, hotels, and airports). In contrast to an ordinary telecommunications entity, a hotspot aggregator does not (necessarily) own the access networks, but rather relies on a network of independently-owned and operated WLANs hotspots. Examples of current hotspot aggregators are Boingo and iPass.

One or more aggregator services may be offered in a single WLAN hotspot and, in any given WLAN hotspot, some aggregator services may be made offered while others may not be. A WLAN hotspot may utilize only a single Set Service Identifier (SSID) for identification, and it may not be readily apparent to roaming mobile devices what particular aggregator service is provided in any particular WLAN hotspot. Traditionally, an aggregator provides client software to install in the mobile device to aid in finding the appropriate WLANs and signing in for service. Locally-stored directories of WLAN hotspot locations and details may be provided (e.g. which SSIDs are supported), which requires some type of network connection for updates. The existing ways of obtaining service are specific to each particular aggregator. For example, each WLAN hotspot may require a different way of logging in for access (e.g. different web sites for login).

Typically, after installation, conventional client software seizes and maintains control over the WLAN selection mechanism of the mobile device which is utilized for selecting and connecting to an appropriate WLAN. There is little flexibility for a conventional mobile device to be able to utilize multiple aggregator services in an easy and efficient manner.

Accordingly, what are needed are methods and apparatus which overcome these and other related deficiencies of the prior art. Other types of networks and devices may experience the same or similar deficiencies.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Network selection methods and apparatus for communication devices utilizing a "master" service management module and a prioritized list of multiple aggregator service profiles for accessing multiple aggregator services are described herein. A communication device is configured to store one or more aggregator service application modules for use in accessing one or more different aggregator services. Each aggregator service offers access through a plurality of offered wireless networks identified by a plurality of offered wireless network identifiers. The communication device maintains a prioritized list of profiles which include one or more aggregator service profiles associated with the one or more aggregator services. A scanning operation is performed for identifying one or more available wireless networks in a geographic area of the device, for producing a scan list of one or more available wireless network identifiers corresponding to the one or more available wireless networks. One of the aggregator service profiles is selected from the prioritized list, causing one of the aggregator service application modules corresponding to the selected profile to be invoked. The invoked module causes one of the available wireless network identifiers from the scan list that matches one of the offered wireless network identifiers provided via the aggregator service application module to be selected, if such matching identifier exists. A connection is established with one of the available wireless networks corresponding to the selected available wireless network identifier, for accessing a selected aggregator service corresponding to the selected aggregator service profile.

Figure 1:
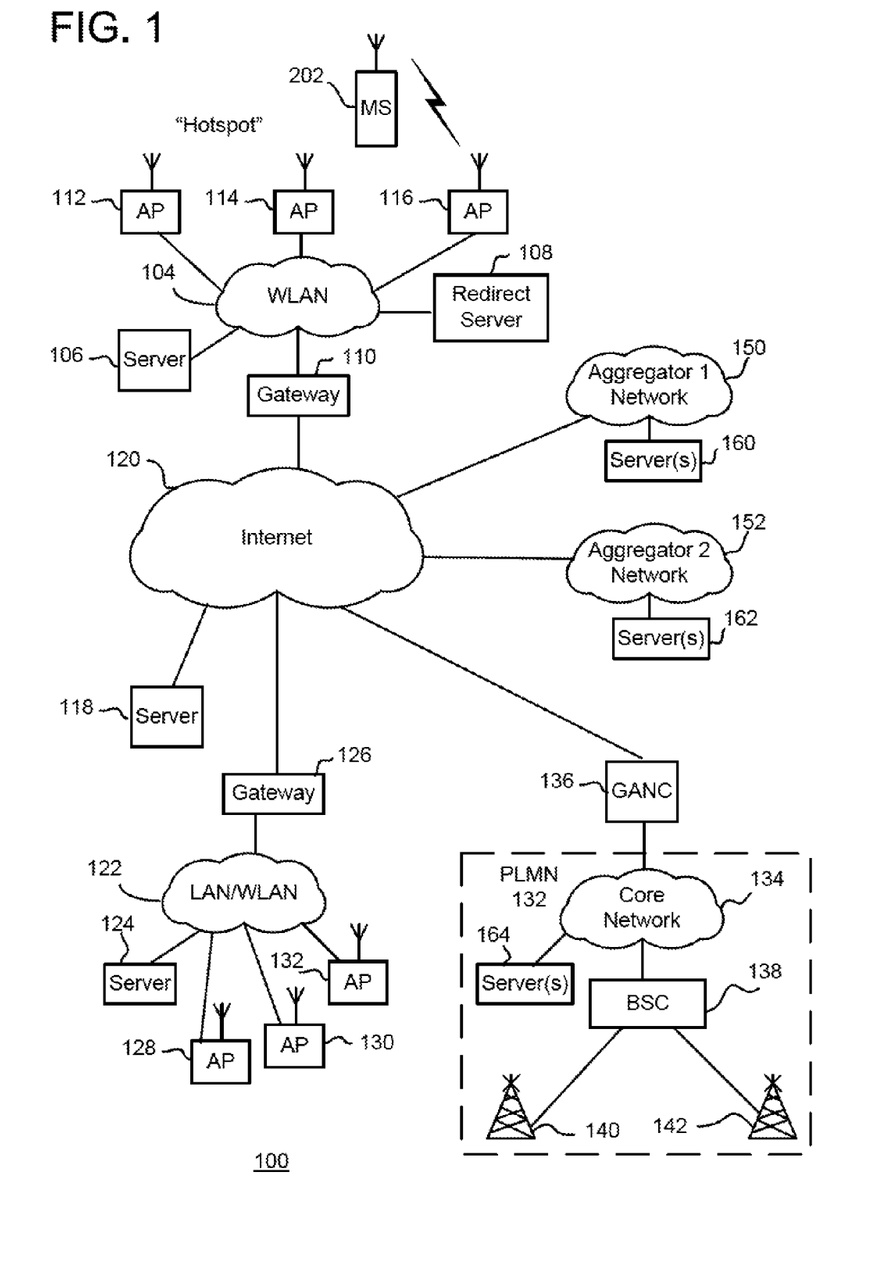
FIG. 1 is an illustrative representation of a communication system which includes a wireless communication network, such as a wireless local area network (WLAN) or WLAN "hotspot," within which a communication device may operate.

To illustrate one exemplary network architecture, FIG. 1 shows a representation of a communication system 100 having a wireless local area network (WLAN) 104 within which a mobile communication device 202 may operate. WLAN 104 has a plurality of wireless access points (APs) 112, 114, and 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate on different WLANs, such as WLAN 122. Similar to WLAN 104, WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202.

Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques. Note that some communication applications utilized by terminals, such as VoIP applications, require the use of SIP. SIP is well-documented in standard documents such as Request For Comments (RFC) 3261.

For "push-type" data or message synchronization services, mobile device 202 is enabled to maintain data synchronization with a server (e.g. server 106, 118, or 124) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via one of wireless APs 112, 114, and 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). Redirect server 108 may be referred to by a different name depending on any more specific purpose (e.g. authentication server, registration server, user confirmation server, etc.).

The user will enter a user response via the Web browser application, for example, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an enterprise associated with mobile device 202. For devices attempting to access WLAN 122 via Internet 120, gateway 126 is configured to accept or reject access requests external to the network. Functions of gateway 126 may be or include authentication, security, QoS functions, account management, and redirection.

As described earlier, the popularity of Internet access through hotspots has led to the emergence of a new kind of entity, namely, a hotspot aggregator. In general, a hotspot aggregator provides wireless Internet access to its customers by renting a WLAN connection to the Internet (i.e. a "WLAN hotspot") from hotspot owners (e.g. at coffee shops, hotels, and airports). In contrast to an ordinary telecommunications entity, a hotspot aggregator does not (necessarily) own the access networks, but rather relies on a network of independently-owned and operated access networks. Examples of current hotspot aggregators are Boingo and iPass.

In FIG. 1, a plurality of hotspot aggregator networks 150 and 152 associated with different hotspot aggregators are shown. Each aggregator network 150 and 152 is communicatively coupled to the Internet 120. The number of different hotspot aggregators shown in FIG. 1 is two (2); however, any suitable number greater than two (2) may be available in practice. For illustration, aggregator network 150 may be associated with an aggregator named "Boingo" and provide Boingo service through use of one or more servers 160; and aggregator network 152 may be associated with an aggregator named "iPass" and provide iPass service through use of one or more servers 162. Each aggregator has relationships with one or more different entities that provide wireless service access at a plurality of different hotspots or hotspot locations. Each aggregator may provide a different type of aggregator service for mobile devices; typically, however, each aggregator may offer at least Internet access via a plurality of hotspots. Servers 160 and 162 may be adapted to provide or otherwise facilitate the aggregator service for the mobile devices, performing functions such as authenticating for service, monitoring service, billing functions, providing service information or subscription information, subscribing new mobile devices or users, and/or managing subscriptions and subscription information, to name a few.

Another service which may be provided may be based on Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are adapted to establish and maintain a (secure) tunnel connection between each other through the intervening networks. Note that WLAN 104 may be operator-controlled or provided (e.g. controlled or provided by the operator associated with PLMN 132), user-controlled or provided (e.g. controlled or provided by the end user of mobile device 202), or third-party-controlled or provided. Again, GANC 136 operates in accordance with GAN based technology (formerly known as Unlicensed Mobile Access (UMA), and may be or include GANC 136 (formerly known as UMA Network Controller or UNC) or the like. Finally, note that mobile device 202 may be a wireless handset of the dual-mode type, having both WLAN and cellular (WWAN) radio interfaces. Thus, mobile device 202 may access services of core network 134 of PLMN 132 with use of its cellular radio interface, as well as access services via WLANs with use of its WLAN radio interface.

Figure 2:
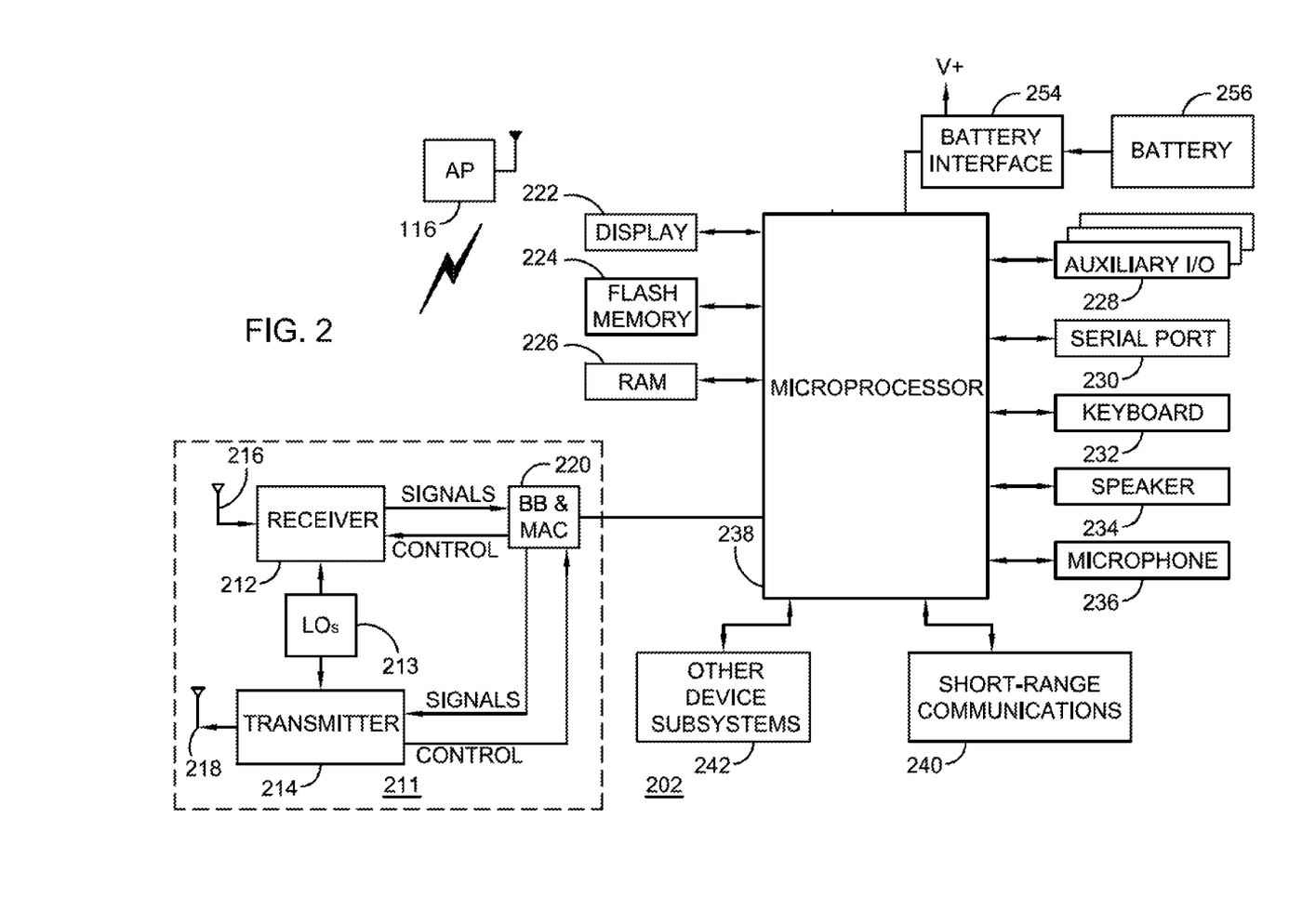
FIG. 2 is a schematic block diagram of a mobile communication device operative in a WLAN.

Referring now to FIG. 2, electrical components of a typical mobile communication device 202 (e.g. a mobile station, mobile terminal, or user equipment "UE", or the like) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with wireless APs of WLANs, such as AP 116 of WLAN 104 of FIG. 1. For communication with AP 116, mobile device 202 utilizes a communication subsystem 211. Depending on the type of device, mobile device 202 may also be adapted to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the network selection techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including data and/or voice communication applications, will normally be installed on mobile device 202 during its manufacture. This includes applications or modules which are configured to perform the network selection techniques of the present disclosure. For this reason, microprocessor 238 (and any other processor(s) or modules of mobile device 202) may enable execution of particular applications or modules for performing enhanced network selection techniques for access to multiple aggregator services.

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. In accordance with the present techniques, microprocessor 238 may process outgoing message requests and incoming responses described later in relation to FIGS. 3A-3B, whether or not such processing is part of the Web browser application. The composed items may be transmitted over a communication network through communication subsystem 211.

For voice communications, the overall operation of mobile, device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a BLUETOOH™ communication module to provide for communication with similarly enabled systems and devices. BLUETOOTH™ is a registered trademark of Bluetooth SIG, Inc.

Figure 4:
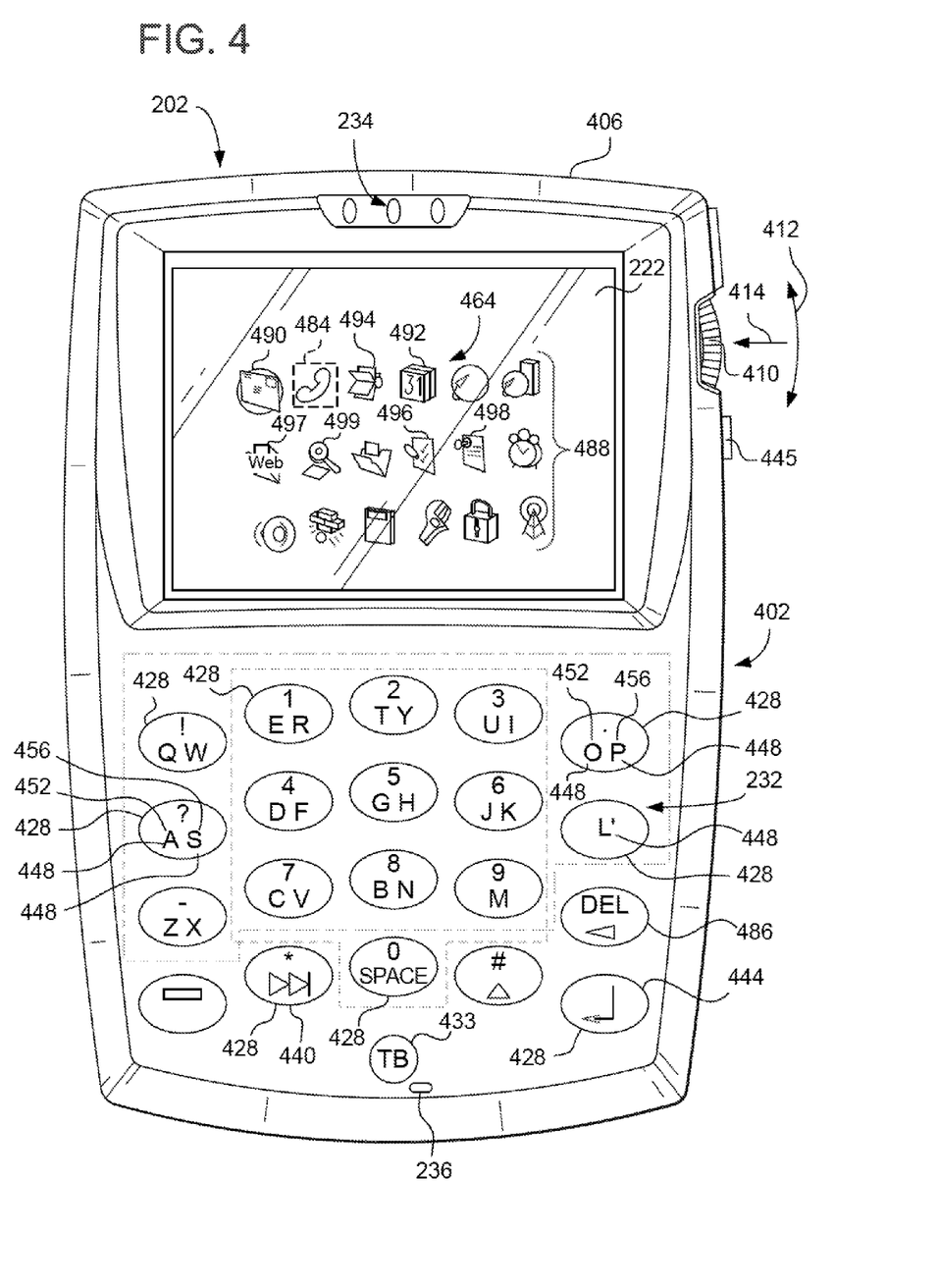
FIG. 4 is an illustrative example of an exemplary user interface of the mobile communication device of FIGS. 1 and 2.

Referring ahead now to FIG. 4, what is shown is an illustrative representation of an exemplary user interface 402 of mobile device 202 of FIGS. 1 and 2 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld-portable device. As an alternative to or in addition to positioning wheel 410 and/or trackball 433, a wide range of one or more pointing or cursor/view positioning mechanisms such as a touch pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Figure 3:
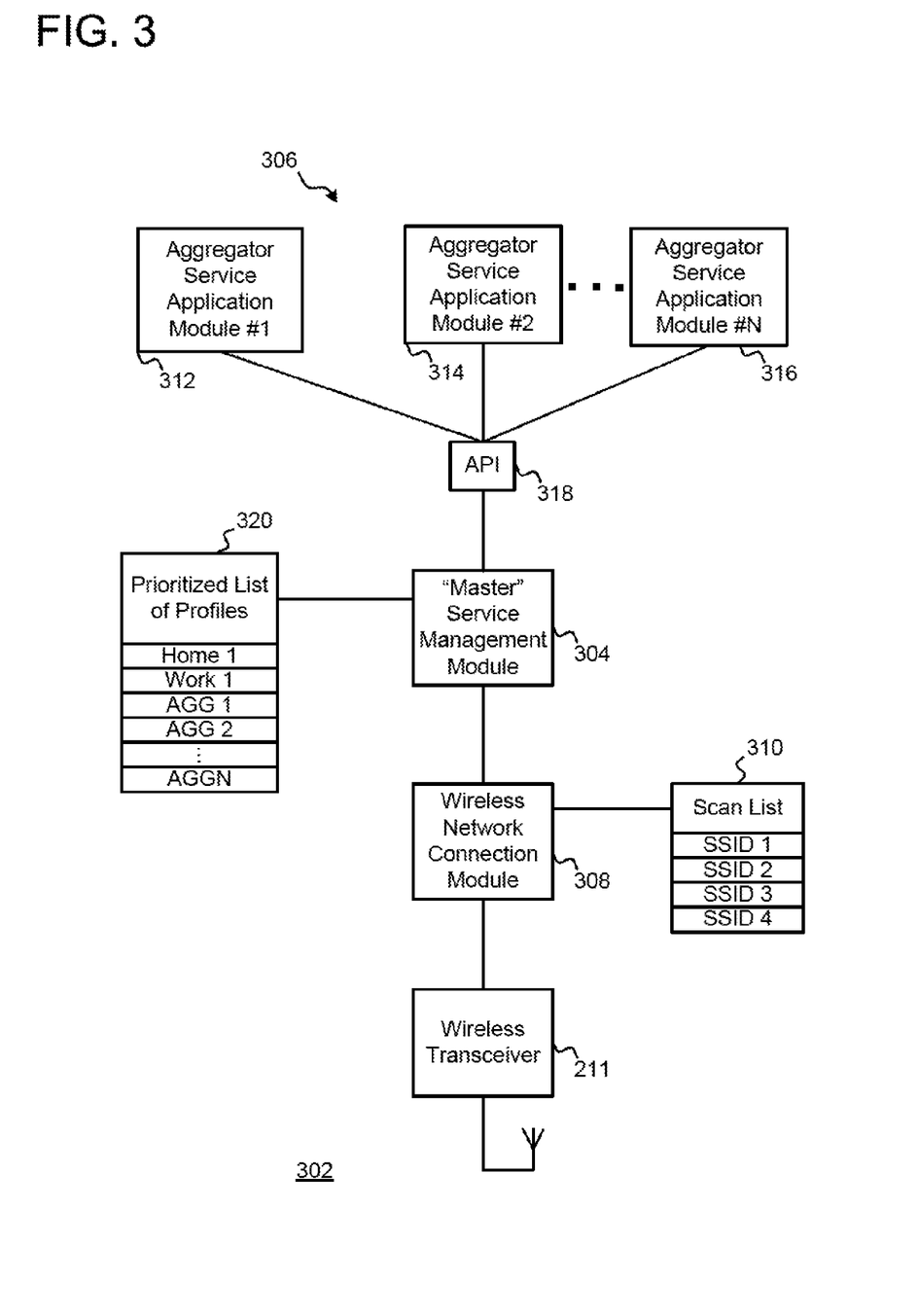
FIG. 3 is an illustration of components and modules for use in a communication device for performing a network selection method of the present disclosure.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
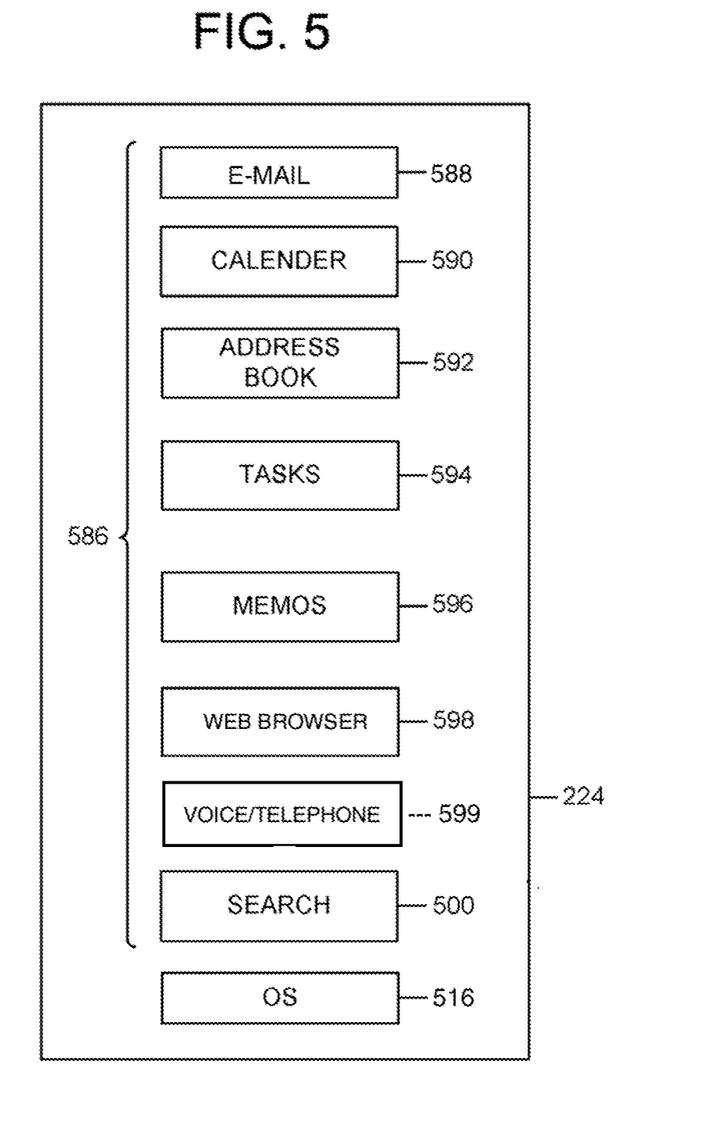
FIG. 5 is an illustrative representation of memory of the mobile communication device which includes a plurality of applications, many of which require some form of data communications.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description of the architecture relates to a specific example for illustration, where the WLAN is an IEEE 802.11-based network, different environments may be applicable as well. The wireless network may be a Bluetooth-based network, a WiMAX-based network (i.e. IEEE 802.16), or an Ultra-WideBand (UWB)-based network (i.e. IEEE 802.15), as a few examples.

Referring back to the environment of FIG. 1, it is noted that mobile device 202 may exit and enter into new and different WLANs during its operation. The new or unknown WLAN may be WLAN 104 which is a WLAN "hotspot" (e.g. providing a captive portal), where a user registration or login or other user response will be required prior to mobile device 202 obtaining any useful services via the WLAN hotspot. The "walled garden" of the WLAN hotspot prohibits such access. Fortunately, hotspot aggregators enable mobile devices to obtain service in a (e.g. large) number of different WLAN hotspots in any easy manner. A hotspot aggregator provides wireless Internet access to its customers by renting a WLAN connection to the Internet (i.e. the "WLAN hotspot") from a plurality of hotspot owners (e.g. at coffee shops, hotels, and airports). In contrast to an ordinary telecommunications entity, a hotspot aggregator does not (necessarily) own the access networks, but rather relies on a network of independently-owned and operated WLANs hotspots. Examples of current hotspot aggregators are Boingo and iPass.

One or more aggregator services may be offered in a single WLAN hotspot and, in any given WLAN hotspot, some aggregator services may be made offered while others may not be. A WLAN hotspot may utilize only a single Set Service Identifier (SSID) for identification, and it may not be readily apparent to roaming mobile devices what particular aggregator service is provided in any particular WLAN hotspot. Traditionally, an aggregator provides client software to install in the mobile device to aid in finding the appropriate WLANs and signing in for service. Locally-stored directories of WLAN hotspot locations and details may be provided (e.g. which SSIDs are supported), which requires some type of network connection for updates. The existing ways of obtaining service are specific to each particular aggregator. For example, each WLAN hotspot may require a different way of logging in for access (e.g. different web sites for login).

After installation, conventional client software typically seizes and maintains control over the WLAN selection mechanism of the mobile device which is utilized for selecting and connecting to an appropriate WLAN. There is little flexibility for a conventional mobile device to be able to utilize multiple aggregator services in an easy and efficient manner.

FIG. 3 is an illustration of components and/or modules 302 of a communication device for use in performing a network selection method of the present disclosure. Such modules 302 may be utilized to overcome prior art deficiencies and other related deficiencies in these and other environments than the ones described. The communication device which contains the modules 302 may be the mobile communication device described herein in relation to FIGS. 1-2 and 4-5.

As shown in FIG. 3, the modules 302 include a "master" service management module 304, a plurality of aggregator service application modules 306, and a wireless network connection module 308. Master service management module 304 may hereinafter be referred to as "master module 304", aggregator service application modules 306 may hereinafter be referred to as "aggregator modules 306", and wireless network connection module 308 may hereinafter be referred to as "connection module 308".

Aggregator modules 306 may include aggregator modules 312, 314, and 316 which are designated as modules 1, 2, . . . , to N, as shown in FIG. 3. One or more aggregator modules 306 may be initially stored in memory during manufacture or dealer configuration of the mobile device. Alternatively, or in combination with the above, one or more aggregator modules 306 may be received and installed in memory of the mobile device after manufacture of the mobile device, one-by-one as desired or needed by the user. For example, one or more aggregator modules 306 may be received over-the-air via a wireless network (e.g. WLAN 112 or PLMN 132 of FIG. 1) and installed in memory of the mobile device, one-by-one as desired or needed by the user.

Aggregator modules 306 are configured for use in accessing a plurality of different aggregator services (e.g. Boingo, iPass, etc.). Aggregator modules 306 may alternatively be referred to as hotspot client modules. Each aggregator service offers access through a plurality of offered wireless networks (e.g. various WLAN hotspots), and these offered wireless networks may be identified by a plurality of offered wireless network identifiers. The offered wireless network identifiers of offered wireless networks for service are provided via the corresponding aggregator module. Such information may be initially stored in memory upon installation of the aggregator module. Alternatively, or in combination with the above, such information may be received over the network as needed (e.g. per location area), which may be over-the-air via a wireless network (e.g. WLAN 112 or PLMN 132 of FIG. 1). Once initially obtained, the information may be regularly updated over-the-air via a wireless network.

Master module 304 is indeed configured to have "master" control over each one of the aggregator ("slave") modules 306. Master module 304 is configured to interface and communicate with each one of aggregator modules 306 in accordance with an application programming interface (API) 318. Further, master module 304 is configured to maintain "master" control and interact with connection module 308, preferably in an exclusive manner (i.e. as opposed to any of aggregator modules 306 interacting with connection module 308).

During installation of one of the aggregator modules 306 in memory of the mobile device, a registration process is performed. The registration process allows master module 304 to receive aggregator service information to receive, build, or otherwise produce an aggregator service profile for the corresponding aggregator service. The information for the aggregator service profile may be obtained during or as part of the installation process, over-the-air from a wireless network, and/or via the user interface of the mobile device. In one embodiment, the information in an aggregator service profile may be or include an aggregator identification, an aggregator name, the plurality of offered wireless network identifiers (e.g. even a subset, for example, per location area), and one or more server names for authentication and/or access, as examples.

Again, master module 304 is configured to maintain "master" control and interact with connection module 308, preferably in an exclusive manner (i.e. as opposed to any of aggregator modules 306 interacting with connection module 308). In turn, connection module 308 is configured to interact with and/or instruct wireless transceiver 211 to perform scanning operations for identifying available wireless networks within a geographic region of the mobile device. Available wireless networks identified by connection module 308 are made part of a scan list 310 of wireless network identifiers corresponding to the available wireless networks. In the example of FIG. 3, scan list 310 shows that four (4) different wireless networks are available, namely, wireless networks identified "SSID1", "SSID2", "SSID3", and "SSID4". Connection module 308 is also configured to connect with a selected wireless network with use of a selected wireless network identifier corresponding to the selected wireless network. Once connection is made to the appropriate selected wireless network, the mobile device may obtain the appropriate aggregator service via the selected wireless network.

As shown in FIG. 3, master module 304 is also configured to maintain a prioritized list 320 of profiles. The profiles in prioritized list 320 may include profiles of one or more wireless networks and/or one or more aggregator services. Any wireless network having a profile in prioritized list 320 may be identified by a wireless network identifier, such as an SSID, or by a wireless network name.

On the other hand, any aggregator service having a profile in prioritized list 320 may be identified by an aggregator service identifier or name. In the example of FIG. 3, prioritized list 320 shows that five (5) different profiles are included and prioritized, namely, two (2) profiles of wireless networks corresponding to identifiers "HOME1" and "WORK1", and three (3) profiles of aggregator services corresponding to identifiers "AGG1", "AGG2", and "AGGN". Each profile of an aggregator service may store or include other relevant information as well, such as authentication credentials for login to the hotspot/network.

For network selection, master module 304 is also configured to provide an automatic profile/network selection technique and a manual profile/network selection technique. These techniques make use of the prioritized list of profiles and the scan list of available wireless network identifiers (see e.g. FIG. 3). There may be two (2) separate profiles kept for the manual and the automatic network selection technique. In the manual profile/network selection technique, the scan list is displayed in the display as a user input prompt. The user manually selects one of the profiles/networks in the scan list via the user interface and, in response, connection module 308 is instructed to connect to a wireless network associated with the same. In the automatic profile/network selection technique, the mobile device automatically selects, without user intervention, the next best one of the profiles/networks in the prioritized list in prioritized order. If a selected wireless network identifier matches an available wireless network identifier from the scan list, then connection module 308 is instructed to connect to a wireless network associated with the same. Note that such automatic/manual selection techniques or functionality may alternatively be provided within a module different from master module 304.

Master module 304 may be further configured to maintain "master" control over the use of aggregator modules 306 (its "slaves") during wireless operation. In particular, master module 304 may receive and interpret requests from the wireless network and, in response, make the appropriate calls to the proper aggregator module, so that the aggregator module may properly respond to such requests using predetermined protocols (e.g. including proprietary protocols). For example, master module 304 may receive a hotspot/network login requirement from the wireless network and, in response, make the appropriate call to the selected aggregator module so that the aggregator module may perform its credentials submission and/or login procedure with the hotspot/network.

Even further, master module 304 may be further configured to maintain "master" control over the presentation of the display of the mobile device. Even though an aggregator service may be selected for communications, the aggregator module corresponding to the selected aggregator service makes display presentation requests (if at all) through master module 304 and, in response, master module 304 calls the appropriate display data and/or presentations with the appropriate information for display.

Figure 6:
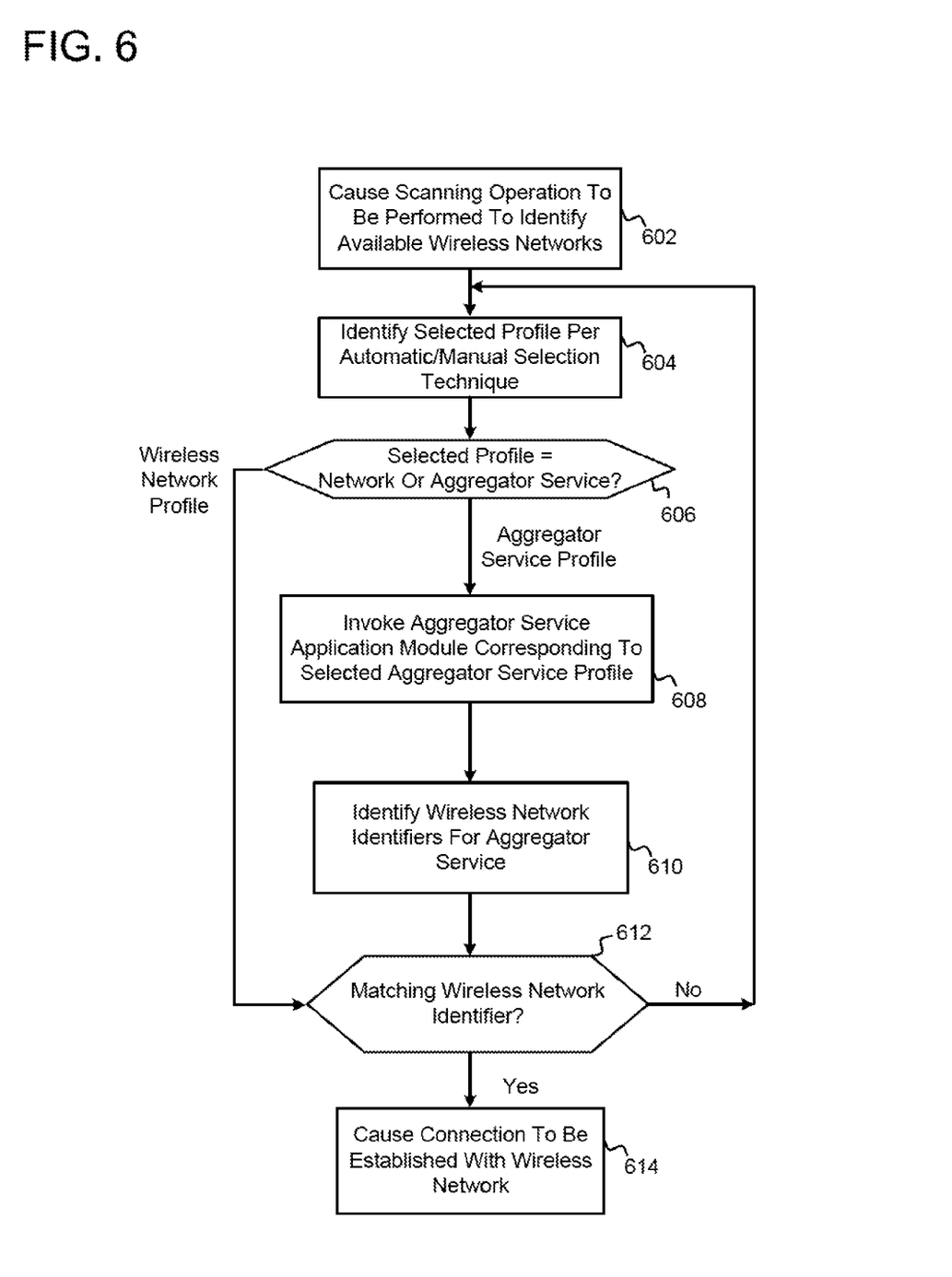
FIG. 6 is a flowchart of the network selection method for mobile communication devices which utilizes a "master" service management module prioritized list of multiple aggregator service profiles for accessing multiple aggregator services.

FIG. 6 is a flowchart of the network selection method for communication devices which utilizes a master service management module and a prioritized list of multiple aggregator service profiles for accessing multiple aggregator services. The method of FIG. 6 may be performed by the communication device described in relation to FIGS. 1-5. In particular, the techniques described in relation to the flowchart may be performed by one or more controllers or processors of the communication device along with its wireless transceiver. Specifically, the techniques may be employed using the master service management module, the wireless network connection module, and corresponding aggregator service application modules, as described earlier in relation to FIG. 3. A computer program product which may embody the technique may include a computer readable medium (e.g. memory of the communication device, computer disk, CD-ROM, etc.) having computer instructions stored therein which are executable by the one or more processors of the mobile device for performing the technique. In the described embodiment, the mobile device and wireless networks generally operate in accordance with IEEE 802.11 standards, and therefore the appropriate IEEE 802.11 related standards apply where applicable.

As described earlier in relation to FIG. 3, the communication device is configured to store a plurality of aggregator service application modules for use in accessing a plurality of aggregator services. Each aggregator service offers access through a plurality of offered wireless networks identified by a plurality of offered wireless network identifiers. The offered wireless network identifiers for each service are provided via the corresponding aggregator service application module. The mobile device also maintains a prioritized list of profiles which include a plurality of aggregator service profiles associated with the plurality of aggregator services.

Referring to FIG. 6, it is assumed that the mobile device has not yet connected to a wireless network or has lost wireless network coverage. The controller of the mobile device causes a scanning operation to be performed with use of the wireless transceiver to scan for wireless communication networks available in its geographic region (step 602 of FIG. 6). A wireless network may be identified by a wireless network identifier which may be, in the present WLAN environment, a set service identifier (SSID). A scan list of wireless network identifiers corresponding to available wireless networks may be produced as a result of such step. The scanning in the WLAN environment may be a passive scan or an active scan. Such scanning operations may be performed periodically or regularly, in the background, in accordance with a predetermined algorithm.

One of the profile/network selection techniques is invoked at the mobile device (e.g. the automatic or manual profile/network selection technique). The master module identifies which profile has been selected from the profile/network selection technique (step 604 of FIG. 6). If as identified in step 606 the selected profile corresponds to a wireless network, then the master module will receive such indication which includes a wireless network identifier (e.g. SSID) corresponding thereto. The master module compares the selected wireless network identifier with available wireless network identifiers in the scan list, for identifying whether the selected wireless network identifier matches any of the available wireless network identifiers (step 612 of FIG. 12). If yes in step 612, the master module instructs the connection module to establish a connection with the wireless network identified by the wireless network identifier (step 614 of FIG. 6).

On the other hand, if as identified in step 606 the selected profile corresponds to an aggregator service profile, then the master module will receive such indication which includes an aggregator service identifier or name. In response, the master module selects or identifies one of the aggregator modules corresponding to the selected aggregator service identifier or name, and invokes the selected aggregator module to initiate its functionality (step 608 of FIG. 6). For example, the master module may invoke the selected aggregator module by executing it or calling a routine or subroutine thereof. From invoking the selected aggregator module, the master module may identify or select a wireless network identifier of a suitable available wireless network (step 610 of FIG. 6).

As described earlier, a selected aggregator module may provide or produce a plurality of offered wireless network identifiers. In general, the goal is to identify one of the available wireless network identifiers in the scan list that matches one of the offered wireless network identifiers provided via the aggregator module. In one embodiment, in step 610, the master module invokes the selected aggregator module so that it may identify all wireless networks that are both offered and available. In particular, the master module sends or passes the available wireless network identifiers of the scan list to the selected aggregator module, which in turn identifies whether any of the available wireless network identifiers in the scan list match any of its offered wireless network identifiers (e.g. through a comparison; step 612 of FIG. 6). The aggregator module returns a list of one or more wireless networks that are both offered and available to the master module.

If a single wireless network identifier is returned, then the master module instructs the connection module to establish a connection with the wireless network identified by the single wireless network identifier (step 614 of FIG. 6). If more than a single wireless network identifier is returned, then the master module selects a preferred one of the wireless network identifiers based on predetermined criteria. In one embodiment, the master module has selection or filtering criteria, such as a list of preferred wireless network identifiers (or associated identification information) for preferred wireless networks, and/or a list of excluded wireless network identifiers (or associated identification information) for excluded wireless networks. Again, the master module instructs the connection module to establish a connection with the wireless network identified by the wireless network identifier (step 614 of FIG. 6).

Note that, after a connection is made in step 614, the master module may receive and interpret requests from the wireless network (e.g. for hotspot/network login) and make the appropriate call(s) to the aggregator module so that the aggregator module may properly respond to such requests (e.g. perform its credentials submission and/or login procedure with the hotspot/network).

If there is no match as identified in step 612 of FIG. 6, then processing returns back to step 606 where the user is prompted via the user interface to select another different profile/network (i.e. in the case of manual network/profile selection) or the master module automatically selects the next best one of the networks/profiles from the prioritized list (i.e. in the case of automatic network/profile selection).

When the quality of the communications with the wireless network become poor or lost (e.g. due to roaming of the mobile device), the method repeats again starting step 602 or 604 of FIG. 6.

Thus, network selection methods and apparatus for communication devices which utilize a "master" service management module and a prioritized list of multiple aggregator service profiles for accessing multiple aggregator services have been described. A communication device is configured to store a plurality of aggregator service application modules for use in accessing a plurality of different aggregator services. Each aggregator service offers access through a plurality of offered wireless networks identified by a plurality of offered wireless network identifiers. The communication device maintains a prioritized list of profiles which include a plurality of aggregator service profiles associated with the plurality of aggregator services. A scanning operation is performed for identifying one or more available wireless networks in a geographic area of the device, for producing a scan list of one or more available wireless network identifiers corresponding to the one or more available wireless networks. One of the aggregator service profiles is selected from the prioritized list, causing one of the aggregator service application modules corresponding to the selected profile to be invoked. The invoked module causes one of the available wireless network identifiers from the scan list that matches one of the offered wireless network identifiers to be selected, if such matching identifier exists. A connection is then established with one of the available wireless networks corresponding to the selected available wireless network identifier, for accessing a selected aggregator service corresponding to the selected aggregator service profile.

The master module utilized may receive and interpret requests from the selected wireless network and, in response, make the appropriate calls to the appropriate aggregator module, so that the aggregator module may properly respond to such requests using predetermined protocols. Further, the master module may be configured to maintain master control over the presentation of the display of the mobile device. Here, the aggregator module may make display presentation requests through the master module and, in response, the master module calls the appropriate display data and/or presentations with the appropriate information for display.

The above-described embodiments of the present disclosure are intended to be examples only. Those of skill in the art may affect alterations, modifications and variations to the particular embodiments without departing from the scope of the application. Although the description of the architecture for FIG. 1 relates to a specific example for illustration, where the WLAN is an IEEE 802.11-based network, different environments may be applicable as well. The wireless network may be a Bluetooth-based network, a WiMAX-based network (i.e. IEEE 802.16), or an Ultra-WideBand (UWB)-based network (i.e. IEEE 802.15), as a few examples. The invention described herein in the recited claims intends to cover and embrace all suitable changes in technology.

What is claimed is:

1. A network selection method for use in a communication device, the communication device being configured to store one or more hotspot aggregator service application modules for use in accessing one or more hotspot aggregator services provided by a hotspot aggregator that is external to the communication device, each said hotspot aggregator service offering access through a plurality of offered wireless networks, and the corresponding hotspot aggregator service application module providing a respective wireless network identifier, including service set identifiers (SSID), for each of the plurality of offered wireless networks, the method comprising:

maintaining, in memory, a prioritized list of profiles which include a plurality of wireless network profiles associated with a plurality of wireless networks and one or more hotspot aggregator service profiles associated with the one or more hotspot aggregator services provided by the one or more offered wireless networks, wherein the one or more hotspot aggregator service profiles each include an aggregator identifier which does not necessarily include wireless network identifiers, including SSIDs, for the one or more offered wireless networks;

causing a scanning operation to be performed for identifying one or more available wireless networks in a geographic area of the communication device, for producing a scan list of one or more available wireless network identifiers corresponding to the one or more available wireless networks, wherein the scan list is stored in the memory;

selecting, in prioritized order, one of the profiles in the prioritized list of profiles;

when the selected profile is one of the hotspot aggregator service profiles, then: invoking one of the hotspot aggregator service application modules corresponding to a selected one of the hotspot aggregator service profiles from the prioritized list of profiles, the one of the hotspot aggregator service application modules configured to:
identify one or more offered wireless network identifiers corresponding to one or more offered wireless networks that offer a hotspot aggregator service corresponding to the selected hotspot aggregator service profile; and compare the one or more available wireless network identifiers in the scan list with the one or more offered wireless network identifiers to identify one or more matching wireless network identifiers;
return a list of one or more hotspot wireless network identifiers that corresponds to one or more wireless networks that are both offered and available; and cause a connection to be established with one of the wireless networks that are both offered and available corresponding to one of the identified hotspot wireless network identifiers in the list.

2. The method of claim 1, wherein the communication device is operative in accordance with IEEE 802.11, and the wireless network identifiers comprise Set Service Identifiers (SSID).

3. The method of claim 1, further comprising:
selecting the hotspot aggregator service profile from the prioritized list in accordance with an automatic network selection method of the communication device.

4. The method of claim 1, further comprising:
communicating, from a master service management module to the hotspot aggregator service application module, the one or more available wireless network identifiers; and
receiving, at the master service management module from the hotspot aggregator service application module, the one or more hotspot wireless network identifiers.

5. The method of claim 1, further comprising:
communicating, from a master service management module to the hotspot aggregator service application module, the one or more available wireless network identifiers;
receiving, at the master service management module from the hotspot aggregator service application module, the one or more hotspot wireless network identifiers that were identified by the hotspot aggregator service application module.

6. The method of claim 1, wherein the hotspot aggregator service application module being invoked comprises a first hotspot aggregator service application module, the available wireless network identifier being selected comprises a first available wireless network identifier, and the available wireless network being connected to comprises a first available wireless network, and when the signal quality of the connection to the first available wireless network is poor or lost the method further comprising:
invoking a second one of the hotspot aggregator service application modules corresponding to a second selected hotspot aggregator service profile from the prioritized list, for selecting a second one of the available wireless network identifiers in the scan list that matches a second one of the offered wireless network identifiers provided via the second hotspot aggregator service application module; and
causing a connection to be established with a second one of the available wireless networks corresponding to the selected second available wireless network identifier.

7. The method of claim 1, further comprising:
causing the prioritized list of profiles which include the wireless network profiles and the one or more hotspot aggregator service profiles to be displayed in a display of the communication device; and
causing the profile from the prioritized list to be selected in accordance with a manual network selection method.

8. The method of claim 1, further comprising:
receiving a request for login; and
calling the hotspot aggregator service application module for submission of authentication credentials to the wireless network.

9. The method of claim 1, wherein maintaining the prioritized list of profiles further comprises maintaining storage of login credentials in the hotspot aggregator service profiles.

10. The method of claim 1, which is embodied as computer instructions stored in a computer readable medium which are executable by one or more processors of the communication device.

11. A communication device, comprising:
one or more processors;
a wireless transceiver coupled to the one or more processors;
a memory coupled to the one or more processors;
the memory being configured to store one or more hotspot aggregator
service application modules for use in accessing one or more hotspot aggregator services provided by a hotspot aggregator that is external to the communication device, each said hotspot aggregator service offering access through a plurality of offered wireless networks, and the corresponding hotspot aggregator service application module providing a respective wireless network identifier, including service set identifiers (SSID), for each of the plurality of offered wireless networks;
the memory being further configured to store a prioritized list of profiles which include a plurality of wireless network profiles associated with a plurality of wireless networks and one or more hotspot aggregator service profiles associated with the one or more hotspot aggregator services provided by one or more offered wireless networks, wherein the one or more hotspot aggregator service profiles each include an aggregator identifier which does not necessarily include wireless network identifiers, including SSIDs, for the one or more offered wireless networks
a wireless network connection module which is executed by the one or more processors, the wireless network connection module being configured to cause a scanning operation to be performed, with use of the wireless transceiver, for identifying one or more available wireless networks in a geographic area of the communication device, for producing a scan list of one or more available wireless network identifiers corresponding to the one or more available wireless networks, wherein the scan list is stored in the memory; and to cause a connection to be established, with use of the wireless transceiver, with a selected available wireless network identified by a selected available wireless network identifier;
and a master service management module which is executed by the one or more processors, the master service management module being configured to select, in prioritized order, one of the profiles in the prioritized list of profiles; when the selected profile is one of the hotspot aggregator service profiles, then: invoke one of the hotspot aggregator service application modules corresponding to a selected one of the hotspot aggregator service profiles that is selected from the prioritized list of profiles, the one of the hotspot aggregator service application modules being configured to: identify one or more offered wireless network identifiers corresponding to one or more offered wireless networks that offer a hotspot aggregator service corresponding to the selected hotspot aggregator service profile; compare the one or more available wireless network identifiers in the scan list with the one or more offered wireless network identifiers to identify one or more matching wireless network identifiers; and return a list of one or more hotspot wireless network identifiers that corresponds to one or more wireless networks that are both offered and available; and cause the connection to be established with one of the wireless networks that are both offered and available corresponding to one of the identified hotspot wireless network identifiers in the list.

12. The communication device of claim 11 which is operative in accordance with IEEE 802.11, and wherein the wireless network identifiers comprise Set Service Identifiers (SSID).

13. The communication device of claim 11, wherein the master service management module is further configured to cause the hotspot aggregator service profile to be selected from the prioritized list in accordance with an automatic network selection method of the communication device.

14. The communication device of claim 11, wherein the master service management module is further configured to communicate, to the hotspot aggregator service application module, the one or more available wireless network identifiers; and receive, from the hotspot aggregator service application module, the one or more hotspot wireless network identifiers.

15. The communication device of claim 11, wherein the master service management module is further configured to communicate, to the hotspot aggregator service application module, the one or more available wireless network identifiers; and receive, from the hotspot aggregator service application module, the one or more hotspot wireless network identifiers that were identified by the hotspot aggregator service application module.

16. The communication device of claim 11, wherein the hotspot aggregator service application module being communicated with comprises a first hotspot aggregator service application module, the available wireless network identifier being selected comprises a first available wireless network identifier, and the available wireless network being connected to comprises a first available wireless network, and when the signal quality of the connection to the first available wireless network is poor or lost, the master service management module is further configured to communicate with a second one of the hotspot aggregator service application modules corresponding to a second selected hotspot aggregator service profile from the prioritized list, for selecting a second one of the available wireless network identifiers in the scan list that matches a second one of the offered wireless network identifiers provided via the second hotspot aggregator service application module; and cause a connection to be made to a second one of the available wireless networks corresponding to the selected second available wireless network identifier.

17. The communication device of claim 11, wherein the master service management module is further configured to cause the prioritized list of profiles which include the wireless network profiles and the one or more hotspot aggregator service profiles to be displayed in a display of the communication device; and cause the profile from the prioritized list to be selected in accordance with a manual network selection method.

18. The communication device of claim 11, wherein the one or more hotspot aggregator names corresponding to the one or more hotspot aggregator names corresponding to the one or more hotspot aggregator service profiles are displayed in the display.

19. The method of claim 1, further comprising:
when there are two or more one hotspot wireless network identifiers, selecting, by the master service management module, a preferred hotspot wireless network identifier based on predetermined criteria.

20. The communication device of claim 11, wherein when there are two or more one hotspot wireless network identifiers, the master service management module is further configured to select a preferred hotspot wireless network identifier based on predetermined criteria.

* * * * *